(12) United States Patent
Adibowo (10) Patent No.: US 10,684,941 B2
(45) Date of Patent: Jun. 16, 2020

(54) PLATFORM FOR DELIVERING AUTOMATED DATA REDACTION APPLICATIONS

(71) Applicant: SAP SE, Walldorf (DE)

(72) Inventor: Sasmito Adibowo, Singapore (SG)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/183,441

(22) Filed: Nov. 7, 2018

(65) Prior Publication Data
US 2020/0142809 A1 May 7, 2020

(51) Int. Cl.
*G06F 9/44* (2018.01)
*G06F 11/36* (2006.01)
*G06F 8/65* (2018.01)
*G06F 8/60* (2018.01)

(52) U.S. Cl.
CPC ............ *G06F 11/3664* (2013.01); *G06F 8/60* (2013.01); *G06F 8/65* (2013.01); *G06F 11/3688* (2013.01); *G06F 11/3692* (2013.01)

(58) Field of Classification Search
CPC .................................................. G06F 11/3664
USPC ........................................................ 717/124
See application file for complete search history.

(56) References Cited

U.S. PATENT DOCUMENTS

| | | | |
|---|---|---|---|
| 10,135,907 B2* | 11/2018 | Palanivel | G06F 8/60 |
| 10,282,281 B2* | 5/2019 | Mallya | G06F 11/3676 |
| 2003/0069781 A1* | 4/2003 | Hancock | G06Q 10/06393 705/7.39 |
| 2009/0307763 A1* | 12/2009 | Rawlins | G06F 9/44505 726/5 |
| 2019/0294525 A1* | 9/2019 | Scheiner | G06F 11/3608 |

* cited by examiner

*Primary Examiner* — Evral E Bodden
(74) *Attorney, Agent, or Firm* — Fish & Richardson P.C.

(57) ABSTRACT

Methods, systems, and computer-readable storage media for receiving, within a customer-side staging environment, a computer-executable ADR application from a vendor, testing the computer-executable ADR application within the staging environment, the staging environment executing the computer-executable ADR application using sample data, receiving feedback from a customer, the feedback including an election to deploy the computer-executable ADR application to a production environment from the staging environment, and providing the computer-executable ADR application to the production environment in response to the election to deploy the computer-executable ADR application, the production environment being sealed from data transfer to the staging environment.

18 Claims, 4 Drawing Sheets

PLATFORM FOR DELIVERING AUTOMATED DATA REDACTION APPLICATIONS

BACKGROUND

Redaction of private information that is contained within electronic data is essential to ensuring the privacy of natural persons whenever data is repurposed for secondary uses, such as research or marketing studies. Several governmental agencies have passed regulations regarding the protection of private information held by companies, and often impose severe penalties on companies that leak or otherwise disclose personally identifiable information (PII) in the company's possession. As a result, applications that automatically redact or remove private information from electronic data are in high demand.

In order to meet customer demand and provide competitive products, software vendors need to deliver frequent updates to their automated data redaction (ADR) applications. Many software vendors provide their customers with frequent software updates by delivering their applications to the customer over the Internet (e.g., cloud-based software), and running the applications on the vendors' own facilities. However, by running such applications on its own facilities, a vendor is exposed to any private information included within the electronic data sent from the customer, and processed by the vendor-side ADR application. By processing private customer data within its own facilities, a vendor increases its risk of data breaches and improper disclosure of customer PII. This risk is particularly acute for vendors providing ADR applications, as the underlying data being processed by such applications frequently contains significant amounts of private information, including PII.

SUMMARY

Implementations of the present disclosure are directed to automated redaction of electronic data. More particularly, implementations of the present disclosure are directed to a platform for delivering automated data redaction (ADR) applications that avoids vendor-side processing of customer-side private data.

In some implementations, actions include receiving, within a customer-side staging environment, a computer-executable ADR application from a vendor, testing the computer-executable ADR application within the staging environment, the staging environment executing the computer-executable ADR application using sample data, receiving feedback from a customer, the feedback including an election to deploy the computer-executable ADR application to a production environment from the staging environment, and providing the computer-executable ADR application to the production environment in response to the election to deploy the computer-executable ADR application, the production environment being sealed from data transfer to the staging environment. Other implementations of this aspect include corresponding systems, apparatus, and computer programs, configured to perform the actions of the methods, encoded on computer storage devices.

These and other implementations can each optionally include one or more of the following features: the data contained within the production environment cannot be accessed by both the vendor and the staging environment; communication of data contained within the production environment is restricted to one or more designated computing systems, the designated computing systems being specific to the customer for which the computer-executable application is deployed; the feedback further includes sample data used for testing the ADR application, and one or more test logs, the test logs including data generated by the execution of the ADR application in the staging environment using the sample data; analyzing the feedback to determine regression of the computer-executable ADR application; scheduling improvements for the computer-executable ADR application based on the feedback; and the computer-executable ADR application includes an update for a computer-executable ADR application previously deployed to the production environment.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to a platform for continuous delivery of computer-executable applications. More particularly, implementations of the present disclosure are directed to an automated data redaction (ADR) application delivery platform that provides continuous delivery of computer-executable applications that provide ADR functionality.

Implementations can include actions of receiving, within a customer-side staging environment, a computer-executable ADR application from a vendor, testing the computer-executable ADR application within the staging environment, the staging environment executing the computer-executable ADR application using sample data, receiving feedback from a customer, the feedback including an election to deploy the computer-executable ADR application to a production environment from the staging environment, and providing the computer-executable ADR application to the production environment in response to the election to deploy the computer-executable ADR application, the production environment being sealed from data transfer to the staging environment.

As introduced above, and as described in further detail herein, implementations of the present disclosure provide an ADR application delivery platform that inhibits vendor-side exposure to customer-side private data, and enables continuous delivery of computer-executable ADR applications to customer system. Implementations of the present disclosure provide advantages over existing software delivery platforms. For example, implementations of the present disclosure enable updating of the ADR applications without requiring vendors to process and, as a result, be exposed to customer-side private data.

To provide further context for implementations of the present disclosure, automated redaction of data, such as electronic data, includes removal, and/or anonymization of private information contained within the electronic data. ADR is useful in many applications. Example applications include, without limitation, repurposing of electronic data for scientific research studies, software optimization, and marketing analytics.

Redaction of private information from electronic data is essential in ensuring the privacy of natural persons when using the data for secondary purposes, such as for research studies. Several government agencies have passed strict regulations regarding the protection of any personally identifiable information (PII) held by companies, including regulations requiring the removal of PII from electronic data retained or transmitted by companies. Severe penalties are often imposed on software vendors and companies that leak or otherwise disclose private customer information. For example, the European Union's General Data Protection Regulation (GDPR) imposes severe penalties for leakage of PII. Under the GDPR, penalties for leaking PII are imposed not only on the entity that controlled the data containing the PII (referred to as data controllers), but also on any vendors that played a role in processing the data containing the PII (referred to as data processors).

ADR applications can be used to help companies comply with information protection regulations, and avoid leakages of PII. In order to satisfy customer demand and provide a competitive product, software vendors need to deliver frequent updates to their ADR applications. Many software vendors strive to provide "on-demand" updates in order to quickly address any problems that an application is experiencing, and to provide customers with the latest technology. Vendors often achieve this goal by providing applications to customers over the Internet (e.g., cloud-based applications). These forms of Internet-based applications are typically run on the vendor's own facilities (e.g., data processors), or on facilities being operated by a subcontractor of the vendor.

Providing applications directly to the customer over the Internet allows for rapid and frequent updates to the application. However, by running such software on its own facilities, a vendor exposes itself to private data. For example, under a cloud-based application regime, customers submit electronic data to the vendor's facilities (e.g., to the cloud operated by the vendor) in order for the data to be processed. This data submitted by the customer for processing by the cloud-based application often includes private data of the customer (e.g., hence, can be referred to as customer-side private data, as it originates at the customer). As a result, the software vendor becomes a processor of its customers' private data. By processing private customer data within its own facilities, a vendor greatly increases its risk of data breaches, and of incurring the associated legal penalties should any private customer information be disclosed. This risk is particularly acute for vendors providing software for ADR, as the underlying data being processed by such software inherently contains private data, and frequently contains significant amounts of PII.

An additional challenge is presented by the fact that the vendors providing the cloud-based software (data processors) may be in a different legal jurisdiction than the entity that controls the data that is being processed by the software (e.g., the customer). Such separation between data controllers and data processors makes it challenging to determine the information protection regulations that apply to the data being processed by the cloud-based application.

In order to avoid being exposed to a customer-side private-data, software vendors, including vendors of ADR software, can instead provide customers with applications that are run completely within the customer's own premise using the customer's own server systems (e.g., on-premise applications). However, providing updates to on-premise applications requires a representative of the software vendor to be on-site at the customer's premise to manually install the applications to the customer's server system and to provide any updates to the application. This process is much more time and resource intensive, and severely limits the frequency with which updates can be provided to the customer compared to a cloud-based system. While on-premise applications significantly reduces vendor exposure to private data, without the ability to provide frequent software updates, vendors with on-premise applications will be slower to react to problems and customer requests.

In view of the above context, and as described in further detail herein, implementations of the present disclosure provide a platform for continuous delivery of computer-executable applications. In further detail, implementations of the present disclosure provide an ADR application delivery platform that provides continuous delivery of computer-executable applications for ADR.

Figure 1:
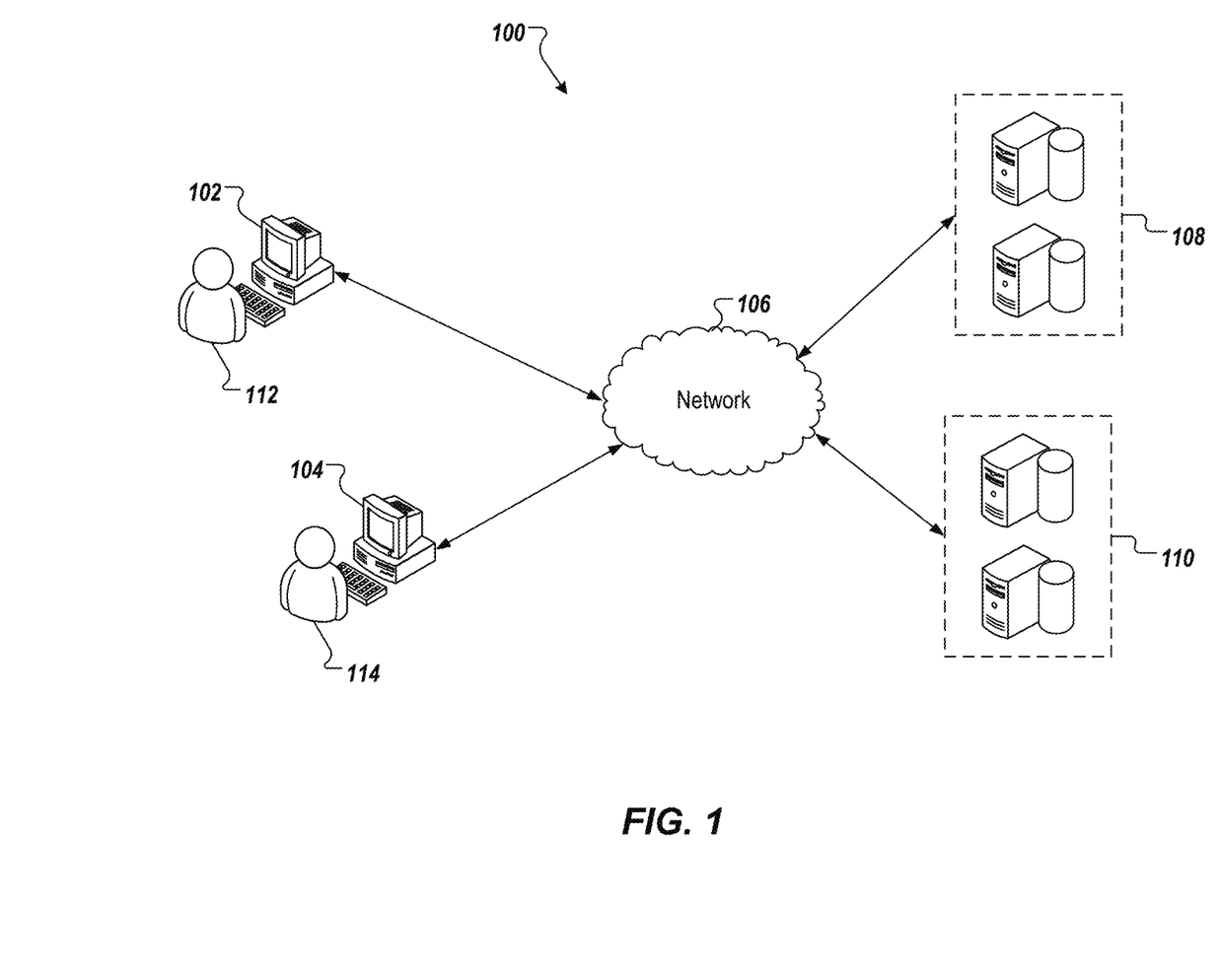
FIG. 1 depicts an example architecture that can be used to execute implementations of the present disclosure.

FIG. 1 depicts an example architecture 100 in accordance with implementations of the present disclosure. In the depicted example, the example architecture 100 includes one or more client devices 102, 104, a network 106, and server systems 108, 110. The server systems 108, 110 each includes one or more server devices and databases (e.g., processors, memory). In the depicted example, respective users 112, 114 interact with the client devices 102, 104. In an example context, the users 112, 114 can include customers who receive applications provided by the server system 108 (e.g., users of enterprises that consume vendor-provided applications), and software developers who interact with the server system 110 to develop vendor-provided applications (e.g., users of vendors that deploy applications to customer systems).

In some examples, the client devices 102, 104 can respectively communicate with the server systems 108, 110 over the network 106. In some examples, the client devices 102, 104 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server systems 108, 110 each includes at least one server and at least one data store. In the example of FIG. 1, the server systems 108, 110 are intended to represent various forms of servers including, but not limited to a web server, an application server, a proxy server, a network server, and/or a server pool. In general, server systems accept requests for application services and provides such services to any number of client devices (e.g., the client devices 102, 104 over the network 106).

In accordance with implementations of the present disclosure, and as noted above, the server system 108 can host an ADR application development environment (e.g., provided as one or more computer-executable programs executed by one or more computing devices). For example, the user 102 can interact with the application development environment to develop one or more ADR applications for eventual deployment to customer systems. In some examples, one or more ADR applications can be deployed to the server system 110, which can execute the one or more ADR applications for customer consumption. That is, for example, the server system 110 can be an on-premise, customer-side system that executes ADR applications for use by a customer enterprise.

As introduced above, and as described in further detail herein, implementations of the present disclosure provide an ADR application delivery platform that insulates vendors from private data during testing and deployment of ADR applications. In some implementations, the ADR application delivery platform includes a vendor-side development environment (e.g., deployed on a vendor-side system, such as the server system 108 of FIG. 1), a customer-side staging environment, and a customer-side production environment (e.g., each deployed on a customer-side system, such as the server system 110 of FIG. 1). In some examples, an ADR application can be deployed to the customer-side staging environment for testing on production data (e.g., which may include private data) before being deployed to the customer-side production environment for production use.

Figure 2:
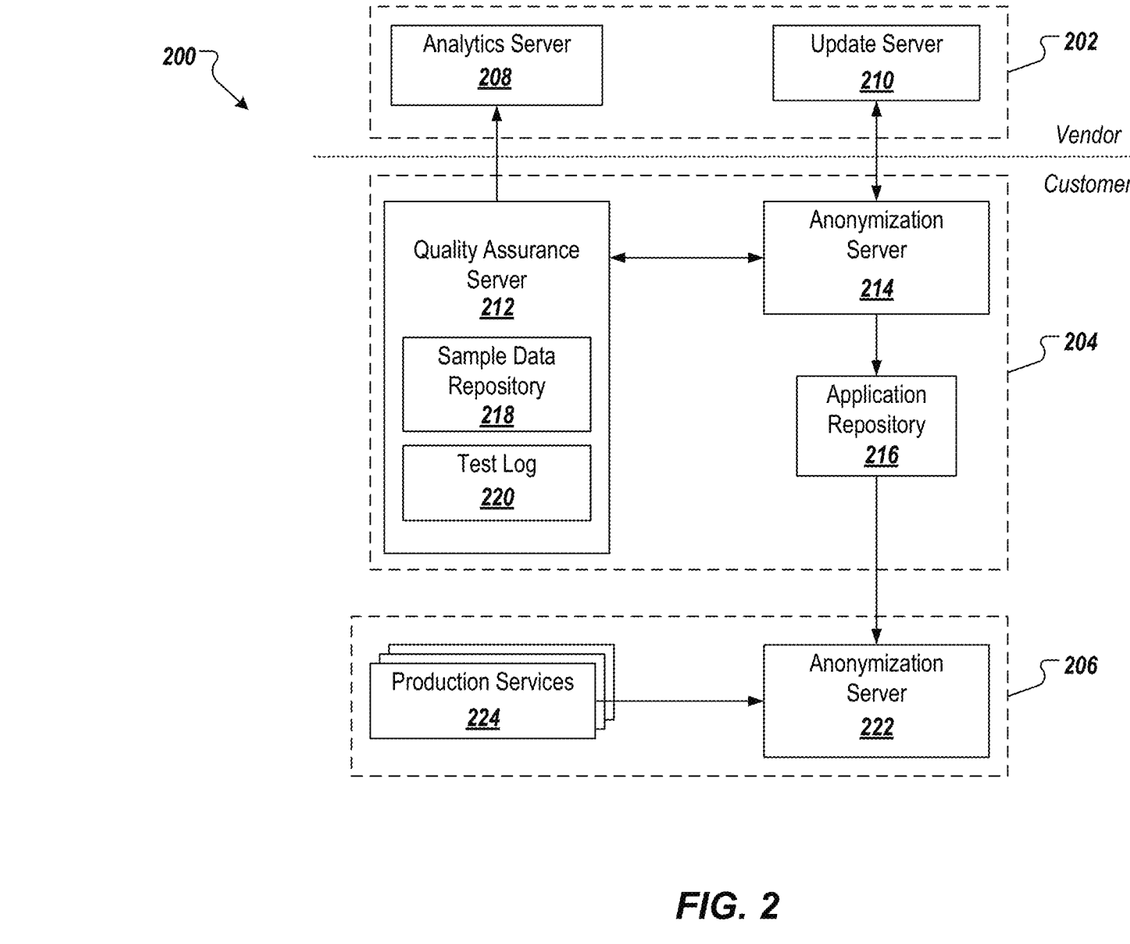
FIG. 2 depicts an example automated data redaction (ADR) application delivery platform in accordance with implementations of the present disclosure.

FIG. 2 depicts an example ADR application delivery platform 200 in accordance with implementations of the present disclosure. In the depicted example, the example ADR application delivery platform 200 includes an application development environment 202 (vendor-side), a staging environment 204 (customer-side), and a production environment 206 (customer-side). As described in further detail herein, an ADR application can be developed within the development environment 202, and can be provided to the staging environment 204 for testing, prior to deployment to the production environment 206. As also described in further detail herein, the vendor-side is insulated from any private data that originates from the customer-side (referred to as customer-side private data). In this manner, the vendor can deploy and ADR applications, which can be tested on customer-side data without the vendor being exposed to the customer-side data.

In accordance with implementations, the development environment 202 includes an analytics server 208, and an update server 210. In some examples, the update server 210 deploys ADR applications (or just updates to ADR applications) to the staging environment 204. In some examples, the analytics server 208 receives test data from the staging environment 204 to determine results of testing performed on the ADR application(s) (e.g., improved performance, regressed performance). In some examples, a vendor-side user can analyze the feedback provided to the analytics server 208, and can schedule improvements to the respective ADR application(s) based on the feedback, if needed.

In the example of FIG. 2, the staging environment 204 includes a quality assurance server 212, an anonymization server 214, and an application repository 216. In some examples, the anonymization server 214 executes an ADR application for testing thereof. If the test results reveal that the ADR application is acceptable for production, the ADR application can be provided to the application repository for eventual deployment to the production environment 206.

In some implementations, the quality assurance server 212 includes a sample data repository 218, and a test log 220. The sample data repository 218 stores sample data for use in testing ADR applications within the staging environment 204. In some examples, sample data includes electronic data that can be used for testing the ADR application. In some examples, the sample data can include production-like data, which can be used to test the ADR application. In some examples, the sample data includes non-sensitive, personally-identifying information. For example, the sample data can include personally-identifying information of natural persons that have consented to the disclosure of the information. In some examples, the sample data can include public data. For example, the sample data can include data that was previously private, but subsequently made public through a governmental or legal proceeding. In some examples, the sample data can include pseudonymized data. For example, personally-identifying information can be manually pseudonymized prior to introduction of the information into the staging environment as sample data. In some examples, sample data can include synthetic data. For example, sample data can include simulated data that resembles production data and is generated for the purpose of testing automated data redaction applications. The sample data repository 210 can store data using any suitable data storage format. In some implementations, the test log 220 stores results produced by processing sample data in the staging environment 204 using the ADR application. The test log 212 can store the results using any suitable data storage format. In some examples, the quality assurance server 204 provides feedback to the analytics server 208. In this manner, the vendor can be informed on the test results of the ADR application, while being sealed from any exposure to private data by the staging environment 204.

In some implementations, ADR applications are deployed from the staging environment 204 to the production environment 206. In some implementations, ADR applications are deployed to the production environment 206 in response to receiving an election from a user (e.g., a user of the customer) to deploy the application to the production environment 206. As described in further detail herein, the production environment 206 is sealed from the remainder of the ADR application delivery platform 200. That is, while an ADR application can be deployed to the production environment 206, the communication is one-way, such that there can be no data leakage back to the staging environment 204.

In some implementations, the ADR application delivery platform 200 includes one or more staging environments (e.g., the staging environment 204 of FIG. 2). In some implementations, each staging environment 204 of the one or more staging environments 204 is specific to a particular customer. The staging environment(s) receive respective ADR applications from the update server 210. In some examples, ADR applications received by the update server 210 are automatically provided to the staging environment(s) 204. In some implementations, ADR applications received by the staging environment(s) 204 are executed in the staging environment(s) 204 using sample data.

In some implementations, the ADR application delivery platform 200 includes one or more production environment(s) (e.g. production environment 206 of FIG. 2), each production environment 206 being specific to a particular customer. In some examples, a user provides feedback within the ADR application delivery platform electing to deploy an ADR application from the staging environment 204 to the production environment 206. In some examples, a user elects to deploy an ADR application from the staging environment 204 to the production environment 206 in response to a successful execution of the application in the staging environment 206. In some examples, upon receipt of an election to deploy the ADR application to the production environment 206, the ADR application is deployed from the staging environment 204 (e.g., from the application repository 216) to the production environment 206.

In some examples, the production environment 206 includes electronic data containing private information (e.g., of user's that the customer services). In some implementations, the production environment 206 includes an anonymization server 222, and one or more production services 224. In some examples, the anonymization server 222 executes one or more ADR applications deployed from the staging environment 204. The ADR applications anonymize private data during production use of customer services. That is, as users consume services computer-implemented services provided by the customer, user data is received, which may include private information. Accordingly, the ADR application executing on the anonymization server 222 anonymizes the private information.

In accordance with implementations of the present disclosure, and as introduced above, the production environment 206 is sealed from the staging environment 204, and the development environment 202. Data contained within the production environment 206, including private data of users, cannot leak outside the production environment 206 into the staging environment 204. In some examples, data contained within the production environment 206 can only be accessed by a customer with the appropriate permissions to access the respective production environment 206, and the production environment 206 cannot be accessed by other users of the ADR application delivery platform 200, such as software vendors, or the general Internet. In some examples, communication of data contained within the production environment 206 is restricted to one or more designated computing systems, the system(s) being specific to a customer.

The ADR applications provided by the ADR application delivery platform perform automated redaction of private information from electronic data. In some implementations, the ADR applications provided by the platform anonymize private information contained within electronic data. In some examples, the ADR applications provided by the platform detect PII contained within electronic data and permanently delete the PII from the electronic data. In some examples, the ADR applications provided by the platform detect PII contained within electronic data and mask the PII by replacing the characters of the PII with a symbol(s) (e.g., x or *). In some implementations, the ADR applications provided by the platform include software updates for ADR applications that have been previously deployed to the staging environment and/or production environment.

Figure 3:
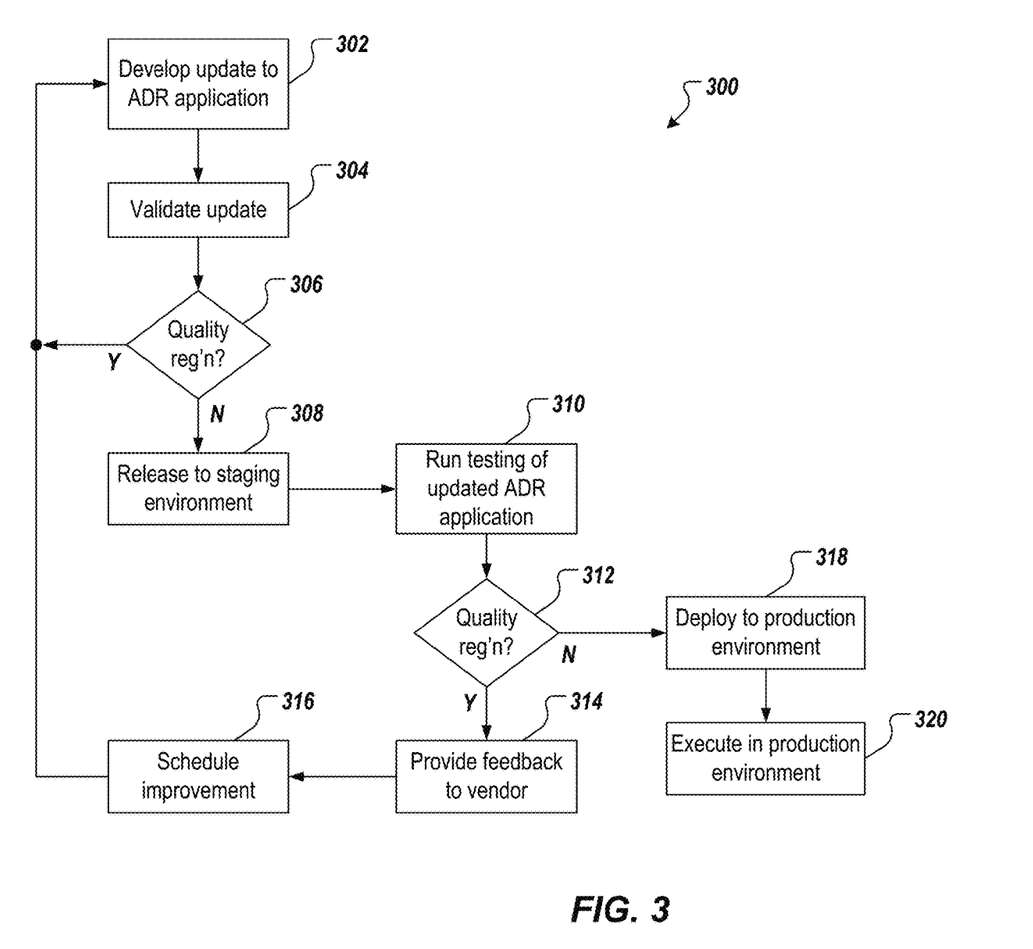
FIG. 3 depicts an example process that can be executed in accordance with implementations of the present disclosure.

FIG. 3 depicts an example process 300 that can be executed in accordance with implementations of the present disclosure. In some examples, the example process 300 is provided using one or more computer-executable programs executed by one or more computing devices. For example, the example process 300 can be executed within an ADR application delivery platform of the present disclosure.

An updated to an ADR application is developed (302). For example, a vendor of ADR applications develops within the development environment 202 of FIG. 2. In some examples, original ADR applications are developed. In some examples, updates to existing ADR applications are developed. The example process 300 is described in further detail with updated to ADR applications. The update is validated (304). For example, testing of the update is performed on the vendor-side (e.g., within the development environment 202) using available test data. It is determined whether there is quality regression (306). For example, the vendor-side testing can provide test results that can indicate whether the update to the ADR application results in regression. In some examples, regression can include, without limitation, slower execution of the ADR application, increased resource consumption (e.g., processors, memory), and/or inaccurate data anonymization, as compared to a previous version of the ADR application. If there is quality regression, the example process 300 loops back. That is, for example, the vendor further develops the update in an effort to resolve the regression.

If there is no quality regression, the ADR application update is released to a staging environment (308). For example, the update is pushed to the staging environment 204 from the development environment 202. The updated ADR application is tested (310). For example, the ADR application with the update is executed within the staging environment (e.g., by the anonymization server 214) using customer-side test data. It is determined whether there is quality regression (312). For example, the customer-side testing can provide test results that can indicate whether the update to the ADR application results in regression.

If there is quality regression, feedback is provided to the vendor (314), and an improvement is scheduled (316). For example, the staging environment 204 can provide test results data, and test data used in testing of the updated ADR application to the development environment (202). In some examples, the vendor further develops the update in an effort to resolve the regression seen in the customer-side testing. If there is no quality regression, the ADR application is deployed to a production environment (318). For example, the updated ADR application is provided to the application repository 216, from which the updated application is deployed for production use in the production environment 206. The ADR application is executed within the production environment (320).

Figure 4:
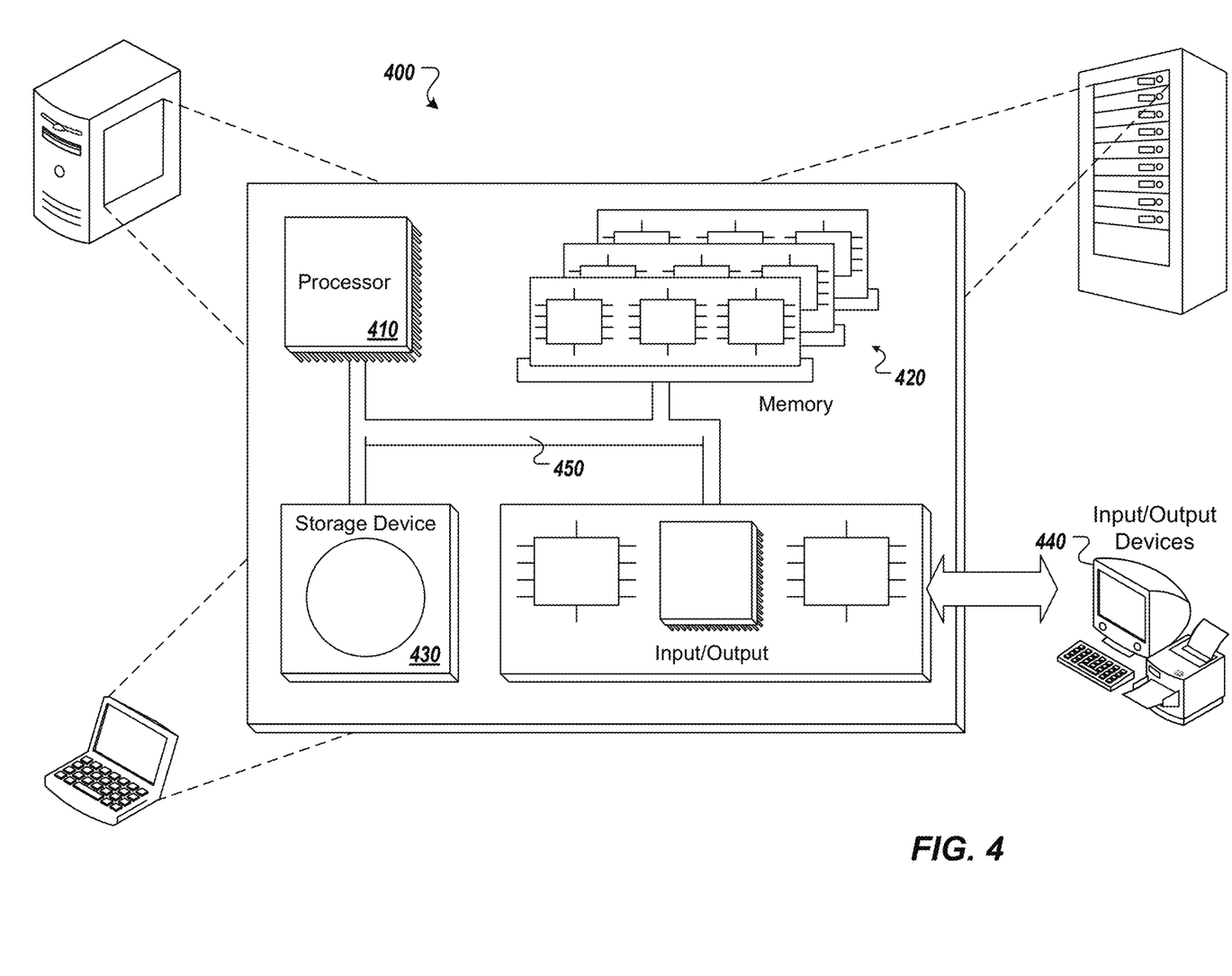
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In some implementations, the processor 410 is a single-threaded processor. In some implementations, the processor 410 is a multi-threaded processor. The processor 410 is capable of processing instructions stored in the memory 420 or on the storage device 430 to display graphical information for a user interface on the input/output device 440.

The memory 420 stores information within the system 400. In some implementations, the memory 420 is a computer-readable medium. In some implementations, the memory 420 is a volatile memory unit. In some implementations, the memory 420 is a non-volatile memory unit. The storage device 430 is capable of providing mass storage for the system 400. In some implementations, the storage device 430 is a computer-readable medium. In some implementations, the storage device 430 may be a floppy disk device, a hard disk device, an optical disk device, or a tape device. The input/output device 440 provides input/output operations for the system 400. In some implementations, the input/output device 440 includes a keyboard and/or pointing device. In some implementations, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube), LCD (liquid crystal display), or OLED (organic light emitting diode) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for delivering automated data redaction (ADR) applications, the method being executed by one or more processors and comprising:

receiving, within a customer-side staging environment, a computer-executable ADR application from a vendor;

testing the computer-executable ADR application within the customer-side staging environment, the customer-side staging environment executing the computer-executable ADR application using sample data;

receiving feedback from a customer, the feedback comprising an election to deploy the computer-executable ADR application to a customer-side production environment from the customer-side staging environment;

transmitting the feedback to a computing device associated with the vendor, wherein the computing device associated with the vendor schedules one or more improvements for the computer-executable ADR application based at least in part on the feedback; and providing the computer-executable ADR application to the customer-side production environment in response to the election to deploy the computer-executable ADR application, the customer-side production environment being sealed from data transfer to the customer-side staging environment and data contained in the customer-side production environment cannot be accessed by the customer-side staging environment.

2. The method of claim 1, wherein data contained within the customer-side production environment cannot be accessed by the vendor.

3. The method of claim 2, wherein communication of data contained within the customer-side production environment is restricted to one or more designated computing systems, the designated computing systems being specific to the customer for which the computer-executable application is deployed.

4. The method of claim 1, wherein the feedback further comprises:
sample data used for testing the ADR application; and
one or more test logs, the test logs comprising data generated by the execution of the ADR application in the customer-side staging environment using the sample data.

5. The method of claim 1, further comprising analyzing the feedback to determine regression of the computer-executable ADR application.

6. The method of claim 1, wherein the computer-executable ADR application comprises an update for a computer-executable ADR application previously deployed to the customer-side production environment.

7. A non-transitory computer-readable storage medium coupled to one or more processors and having instructions stored thereon which, when executed by the one or more processors, cause the one or more processors to perform operations for delivering automated data redaction (ADR) applications, the operations comprising:
receiving, within a customer-side staging environment, a computer-executable ADR application from a vendor;
testing the computer-executable ADR application within the customer-side staging environment, the customer-side staging environment executing the computer-executable ADR application using sample data;
receiving feedback from a customer, the feedback comprising an election to deploy the computer-executable ADR application to a customer-side production environment from the customer-side staging environment;
transmitting the feedback to a computing device associated with the vendor, wherein the computing device associated with the vendor schedules one or more improvements for the computer-executable ADR application based at least in part on the feedback; and
providing the computer-executable ADR application to the customer-side production environment in response to the election to deploy the computer-executable ADR application, the customer-side production environment being sealed from data transfer to the customer-side staging environment and data contained in the customer-side production environment cannot be accessed by the customer-side staging environment.

8. The computer-readable storage medium of claim 7, wherein data contained within the customer-side production environment cannot be accessed by the vendor.

9. The computer-readable storage medium of claim 8, wherein communication of data contained within the customer-side production environment is restricted to one or more designated computing systems, the designated computing systems being specific to the customer for which the computer-executable application is deployed.

10. The computer-readable storage medium of claim 7, wherein the feedback further comprises:
sample data used for testing the ADR application; and
one or more test logs, the test logs comprising data generated by the execution of the ADR application in the customer-side staging environment using the sample data.

11. The computer-readable storage medium of claim 7, further comprising analyzing the feedback to determine regression of the computer-executable ADR application.

12. The computer-readable storage medium of claim 7, wherein the computer-executable ADR application comprises an update for a computer-executable ADR application previously deployed to the customer-side production environment.

13. A system, comprising:
one or more processors; and
a computer-readable storage device coupled to the one or more processors and having instructions stored thereon which, are configured to be executed by the one or more processors, cause the one or more processors to perform operations for delivering automated data redaction (ADR) applications, the operations comprising:
receiving, within a customer-side staging environment, a computer-executable ADR application from a vendor;
testing the computer-executable ADR application within the customer-side staging environment, the customer-side staging environment executing the computer-executable ADR application using sample data;
receiving feedback from a customer, the feedback comprising an election to deploy the computer-executable ADR application to a customer-side production environment from the customer-side staging environment;
transmitting the feedback to a computing device associated with the vendor wherein the computing device associated with the vendor schedules one or more improvements for the computer-executable ADR application based at least in part on the feedback; and
providing the computer-executable ADR application to the customer-side production environment in response to the election to deploy the computer-executable ADR application, the customer-side production environment being sealed from data transfer to the customer-side staging environment and data contained in the customer-side production environment cannot be accessed by the customer-side staging environment.

14. The system of claim 13, wherein data contained within the customer-side production environment cannot be accessed by the vendor.

15. The system of claim 14, wherein communication of data contained within the customer-side production environment is restricted to one or more designated computing systems, the designated computing systems being specific to the customer for which the computer-executable application is deployed.

16. The system of claim 13, wherein the feedback further comprises:
sample data used for testing the ADR application; and
one or more test logs, the test logs comprising data generated by the execution of the ADR application in the customer-side staging environment using the sample data.

17. The system of claim 13, further comprising analyzing the feedback to determine regression of the computer-executable ADR application.

18. The system of claim 13, wherein the computer-executable ADR application comprises an update for a computer-executable ADR application previously deployed to the customer-side production environment.

* * * * *